United States Patent
Boileau et al.

(10) Patent No.: US 11,186,379 B2
(45) Date of Patent: Nov. 30, 2021

(54) SYSTEM FOR INSTALLING AND REMOVING A PROPULSION UNIT ON A PYLON OF AN AIRCRAFT

(71) Applicant: SAFRAN NACELLES, Gonfreville l'Orcher (FR)

(72) Inventors: Patrick Boileau, Tournefeuille (FR); Olivier Kerbler, Antony (FR); Julien Lezerac, Toulouse (FR); Aurélien Gonzalez, Blagnac (FR); Loïc Grall, Elancourt (FR); Ludovic Toupet, Alfortville (FR)

(73) Assignee: Safran Nacelles, Gonfreville l'Orcher (FR)

( * ) Notice: Subject to any disclaimer, the term of this patent is extended or adjusted under 35 U.S.C. 154(b) by 802 days.

(21) Appl. No.: 15/653,971

(22) Filed: Jul. 19, 2017

(65) Prior Publication Data
US 2017/0313432 A1 Nov. 2, 2017

Related U.S. Application Data

(63) Continuation of application No. PCT/FR2016/050120, filed on Jan. 21, 2016.

(30) Foreign Application Priority Data

Jan. 21, 2015 (FR) ..................... 15/50490

(51) Int. Cl.
*B64D 27/18* (2006.01)
*F02K 1/72* (2006.01)
(Continued)

(52) U.S. Cl.
CPC ............. *B64D 27/18* (2013.01); *B64D 27/26* (2013.01); *B64D 29/02* (2013.01); *B64D 29/06* (2013.01);
(Continued)

(58) Field of Classification Search
CPC ........ B64D 27/18; B64D 27/26; B64D 29/06; B64D 2027/266; B64D 2027/268; F02K 1/72
See application file for complete search history.

(56) References Cited

U.S. PATENT DOCUMENTS

| 3,750,983 | A | | 8/1973 | Morris | |
|---|---|---|---|---|---|
| 4,442,987 | A | * | 4/1984 | Legrand | .............. F02K 1/72 244/110 B |
| 4,458,863 | A | * | 7/1984 | Smith | .............. B64D 27/00 239/265.29 |
| 9,140,211 | B2 | * | 9/2015 | Metezeau | .............. F02K 1/827 |

(Continued)

FOREIGN PATENT DOCUMENTS

| CN | 103112595 | 5/2013 |
|---|---|---|
| FR | 2102187 | 4/1972 |

(Continued)

OTHER PUBLICATIONS

International Search Report for International Application PCT/FR2016/050120, dated May 12, 2016.

*Primary Examiner* — Timothy D Collins
*Assistant Examiner* — Terri L Filosi
(74) *Attorney, Agent, or Firm* — Burris Law, PLLC

(57) ABSTRACT

The present disclosure concerns a system for installing and removing a propulsion unit on a pylon of an aircraft, a propulsion unit of the type including a nacelle and a turbojet engine, the turbojet engine being linked on the pylon by at least one front suspension and one rear suspension. The system includes a supporting structure which is adapted to support a thrust reverser device, a front suspension of the turbojet engine, which carries a front part of the supporting structure, and which is removably fastened on a front part of the pylon, and a rear suspension of the turbojet engine which carries a rear part of the supporting structure, and which is removably fastened on a rear part of the pylon, and the (Continued)

disengagement of said suspensions of the pylon allowing removing the propulsion unit mounted on the pylon.

12 Claims, 4 Drawing Sheets

(51) Int. Cl.
    *B64D 27/26*     (2006.01)
    *B64D 29/06*     (2006.01)
    *F02C 7/20*     (2006.01)
    *B64D 29/02*     (2006.01)

(52) U.S. Cl.
    CPC ............... *F02C 7/20* (2013.01); *F02K 1/72* (2013.01); *B64D 2027/266* (2013.01); *B64D 2027/268* (2013.01)

(56) References Cited

U.S. PATENT DOCUMENTS

| | | | |
|---|---|---|---|
| 10,190,538 B2 * | 1/2019 | Boileau et al. | F02K 1/72 |
| 2014/0061332 A1 * | 3/2014 | Dezeustre | F02K 1/72 |
| | | | 239/265.19 |
| 2016/0273489 A1 * | 9/2016 | Bunel | F02K 1/72 |
| 2017/0327240 A1 * | 11/2017 | Kerbler | F02K 1/72 |

FOREIGN PATENT DOCUMENTS

| | | | | |
|---|---|---|---|---|
| FR | 2911372 | | 7/2008 | |
| FR | 2952681 | | 5/2011 | |
| FR | 3002785 | | 9/2014 | |
| WO | PCT/FR2014/050460 | * | 3/2014 | ............... F02K 1/72 |
| WO | 2014132011 | | 9/2014 | |
| WO | 2016116710 | | 7/2016 | |

\* cited by examiner

SYSTEM FOR INSTALLING AND REMOVING A PROPULSION UNIT ON A PYLON OF AN AIRCRAFT

CROSS-REFERENCE TO RELATED APPLICATIONS

This application is a continuation of International Application No. PCT/FR2016/050120, filed on Jan. 21, 2016, which claims priority to and the benefit of FR 15/50490 filed on Jan. 21, 2015. The disclosures of the above applications are incorporated herein by reference.

FIELD

The present disclosure relates to a system for installing and removing a propulsion unit on a pylon of an aircraft, the system including a thrust reverser device.

BACKGROUND

The statements in this section merely provide background information related to the present disclosure and may not constitute prior art.

An aircraft is generally driven by several turbojet engines each housed in a nacelle accommodating an assembly of auxiliary actuating devices linked to its operation and providing various functions when the turbojet engine is in operation or stopped.

These auxiliary actuating devices comprise in particular a thrust reverser device.

A turbojet engine nacelle generally has a substantially tubular structure comprising an air inlet upstream of the turbojet engine, a median section intended to surround a fan of said turbojet engine, a downstream section intended to surround the combustion chamber of the turbojet engine and optionally integrating thrust reverser means, and is generally ended by an ejection nozzle whose outlet is located downstream of the turbojet engine.

The modern nacelles are intended to accommodate a bypass turbojet engine capable of generating, by means of fan blades in rotation, a hot air flow (primary flow) and a cold air flow (secondary flow) which circulates outside the turbojet engine through an annular passage, also called a flow path, formed between a fairing of the turbojet engine and an inner wall of the nacelle. The two air flows are ejected from the turbojet engine by the rear of the nacelle.

The role of a thrust reverser is, during the landing of an aircraft, to improve the braking capacity of the latter, by redirecting towards the front at least part of the air ejected from the turbojet engine. In this phase, the thrust reverser obstructs at least part of the flow path of the cold flow and directs this flow towards the front of the nacelle, thereby generating a counter-thrust which is added to the braking of the wheels and air brakes of the aircraft.

In general, the structure of a thrust reverser comprises a cowl which is movably mounted in longitudinal translation from front to rear according to a direction substantially parallel to the axis of the nacelle, between a closed position in which the cowl provides the aerodynamic continuity of the nacelle, and an open position in which the cowl opens a passage in the nacelle.

In the case of a thrust reverser with cascade vanes, the reorientation of the air flow is carried out by cascade vanes, associated with thrust reverser flaps blocking at least partially the air flow path, the cowl having only a simple sliding function aiming at discovering or covering these cascade vanes.

The thrust reverser flaps, also called blocking flaps, in turn, are activated and driven by the sliding of the movable cowl until at least partially obstructing the flow path downstream of the cascades, so as to improve the reorientation of the cold air flow.

There are known nacelles called O-structure nacelles, known as "O-Duct", which have a downstream structure having a substantially peripheral single structure extending from one side of the engine pylon to the other side.

It follows that such a structure generally has a substantially peripheral single cowl which, for maintenance, opens by downstream translation along the longitudinal axis of the nacelle.

For a detailed description, reference can be made to the documents FR 2 911 372 and FR 2 952 681.

Otherwise, the O-structure nacelles comprise cascade vanes which are movably mounted in translation and capable of being retracted at least partially in the thickness of the median section of the nacelle and thus overlap the fan casing when the thrust reverser is inactive, in the direct jet position. In the thrust reversal position, the cascade vanes are displaced with the movable cowl.

In the case of a thrust reverser for an O-structure nacelle, the pylon can be equipped with rails allowing the sliding of the movable cowl and of the cascades.

On modern propulsion units of large dimension and having highly flexible structures, this configuration can induce significant stresses in the structure of the thrust reverser.

A thrust reverser device described in the document FR-A-3002785 is also known, which comprises rails which are arranged on either side of the pylon and which provide the sliding of the movable cowl and of the cascade vanes.

This type of device has disadvantages in particular in that, in the event of relative displacement of the turbojet engine relative to the pylon, the movable cascades, which are fastened on the pylon, may be subjected to deformation forces.

Indeed, in order to limit the volume of the modern nacelles, the section of the movable cascades is limited to limit their overall dimensions, so that the inertia of the cascades and the mechanical strength they oppose is reduced.

In addition, there is also a risk of relative displacement of the rails therebetween and of significant geometrical variations which may compromise the proper operation of the kinematics of the thrust reverser.

Finally, the mounting/dismounting of the propulsion unit involves dismounting all or part of the thrust reverser.

SUMMARY

The present disclosure provides a system for installing and removing a propulsion unit on a pylon of an aircraft, a propulsion unit of the type comprising a nacelle and a turbojet engine, the nacelle extending longitudinally from front to rear along a longitudinal axis, the turbojet engine being linked to the pylon by means of at least one front suspension and one rear suspension, characterized in that it comprises:

a supporting structure which is adapted to support a thrust reverser device and which extends longitudinally, a front suspension of the turbojet engine, which carries a front part of the supporting structure and which is removably fastened on a front part of the pylon, and a rear suspension of the turbojet engine which carries a rear part of the supporting structure, and which is removably fastened on a rear part of the pylon, the disengagement of said suspensions of the pylon allowing the removal of the propulsion unit mounted on the pylon.

Thus, the system according to the present disclosure allows reducing the time required for the installation and the removal of the propulsion unit, which is disengageable from the pylon by releasing the front and rear plates from the pylon.

According to another characteristic, the thrust reverser device comprises at least:

a cowl which is movably mounted in longitudinal translation from front to rear according to a direction substantially parallel to the axis of the nacelle, between a closed position in which the cowl provides the aerodynamic continuity of the nacelle, and an open position in which the cowl opens a passage in the nacelle, and at least one sliding thrust reverser cascade which is driven by the movable cowl, between a retracted position, corresponding to the closed position of the cowl and a thrust reversal position corresponding to the open position of the cowl, in which position the sliding cascade is displaced downstream so as to be able to extend through said passage opened by the cowl, and in that the supporting structure has the shape of a cradle which comprises a first spar and a second spar which extend longitudinally on either side of the pylon, each of said spars carrying means for slidingly guiding the movable cowl and the sliding cascade.

This characteristic allows the thrust reverser device to follow the movements of the engine.

In addition, the means for slidingly guiding the movable cowl and the sliding cascade comprise at least one first pair of rails for guiding the cascade, comprising a first rail and a second rail which are arranged on either side of the pylon and which are designed to provide the sliding of the thrust reverser cascade, and the means for slidingly guiding the movable cowl and the sliding cascade comprise at least a second pair of rails for guiding the cowl, comprising a first rail and a second rail which are arranged on either side of the pylon and which are designed to provide the sliding of the movable cowl.

In addition, the first rail of the first pair of rails for guiding the cascade and the first rail of the second pair of rails for guiding the cowl are aligned on a common straight line, and the second rail of the first pair of rails for guiding the cascade and the second rail of the second pair of rails for guiding the cowl are aligned on the common straight line.

Also, the first spar of the supporting structure comprises:

a first linking portion which is delimited laterally by a first longitudinal edge which extends in the vicinity of the pylon, and by a second longitudinal edge which carries the first rail for guiding the cascade, a second linking portion which is delimited laterally by a first longitudinal edge which extends in the vicinity of the pylon, and by a second longitudinal edge which carries the second rail for guiding the cascade.

Advantageously, each linking portion comprises an opening which is discovered by the movable cowl in its open position, to allow the redirection of the air flow, said opening being adapted to be all or partly obstructed as desired.

The supporting structure has a symmetrical design along a plane of symmetry passing through the axis of the nacelle.

In addition, the front suspension of the turbojet engine is linked on a fan casing of the turbojet engine.

Also, in order to avoid the spacing of the spars, the system according to the present disclosure is equipped with a means for removably retaining the supporting structure, which links the first spar and the second spar of the supporting structure on a first flank and on a second flank, respectively, of the pylon.

According to a variant, the thrust reverser device comprises islets of an inner fixed structure of the thrust reverser which are linked on the supporting structure.

According to another variant, the system comprises at least one security lock of unintentional non-deployment of the movable cowl.

The present disclosure also concerns a turbojet engine nacelle which is equipped with at least one system for installing and removing a propulsion unit of the type described above.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
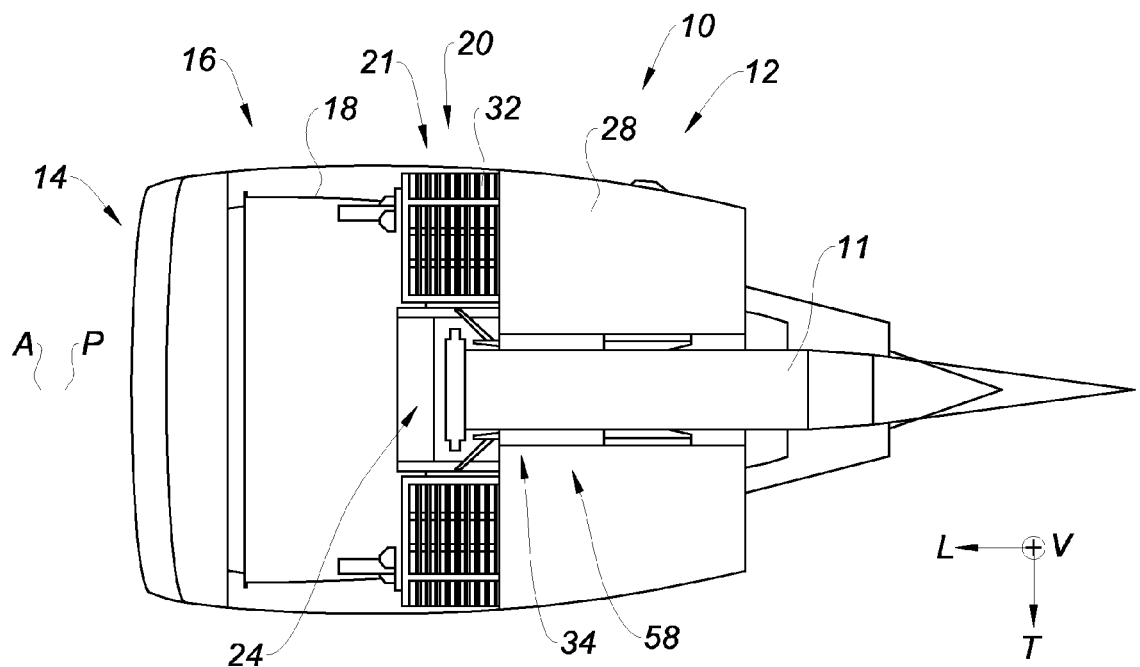
FIG. 1 is an overall schematic top view which illustrates a nacelle equipped with a thrust reverser device including a supporting structure supporting a cowl shown in the closed position, according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In the description and claims, the terms "upper", "lower" and "bottom", "top" are used by way of non-restrictive example, with reference to the upper part and to the lower part, respectively, of FIGS. 1 to 7.

In addition, in order to clarify the description and the claims, the longitudinal, vertical and transverse terminology will be adopted by way of non-restrictive example, with reference to the trihedron L, V, T indicated in Figures, whose longitudinal axis L is parallel to the axis of the nacelle.

It should be understood that, in the present disclosure, the terms "upstream" and "downstream" as used herein should be construed to mean, relative to the circulation of the air flow inside the propulsion unit formed by the nacelle and the turbojet engine, that is to say from the left to the right according to FIGS. 1 to 7.

Also, in order to facilitate the understanding of the description, the identical and symmetrical elements along the plane of symmetry P are indicated by the same numerical references distinguished by the letter "a" or "b".

FIG. 1 shows a propulsion unit 10 mounted on a pylon 11 of an aircraft, the propulsion unit 10 including a nacelle 12 of the O-structure type and a turbojet engine (not shown) housed in the nacelle 12.

The nacelle 12 extends longitudinally from front to rear along a longitudinal axis A.

It is meant here by turbojet engine the part also called "engine" of the propulsion unit 10.

The nacelle 12 has a substantially tubular structure which extends longitudinally along the central axis A and which comprises an air inlet 14 upstream of the turbojet engine, a median section 16 intended to surround a fan 18 of the turbojet engine, a downstream section 20 intended to surround the combustion chamber of the turbojet engine and integrating a thrust reverser device 21 by redirection of an air flow circulating from upstream to downstream in a flow path of the nacelle 12, and an ejection nozzle 22 whose outlet is located downstream of the turbojet engine.

Figure 4:
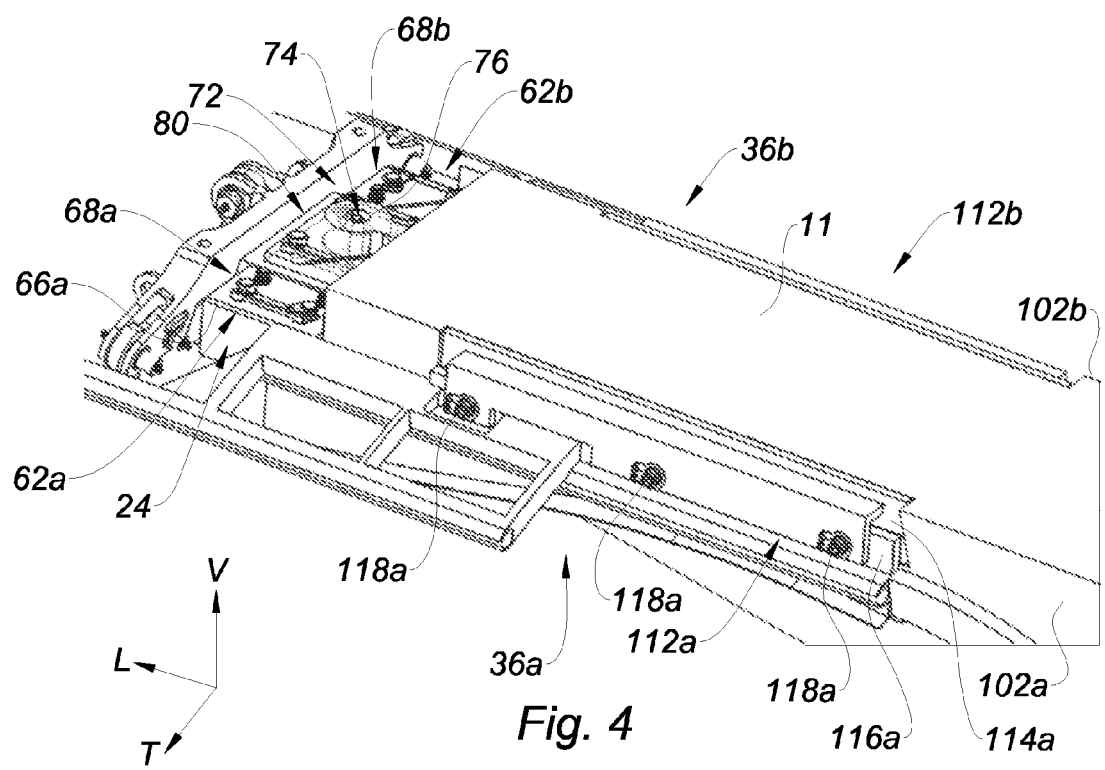
FIG. 4 is a detail perspective view, which illustrates the link of the supporting structure on the front suspension according to the teachings of the present disclosure.
Figure 5:
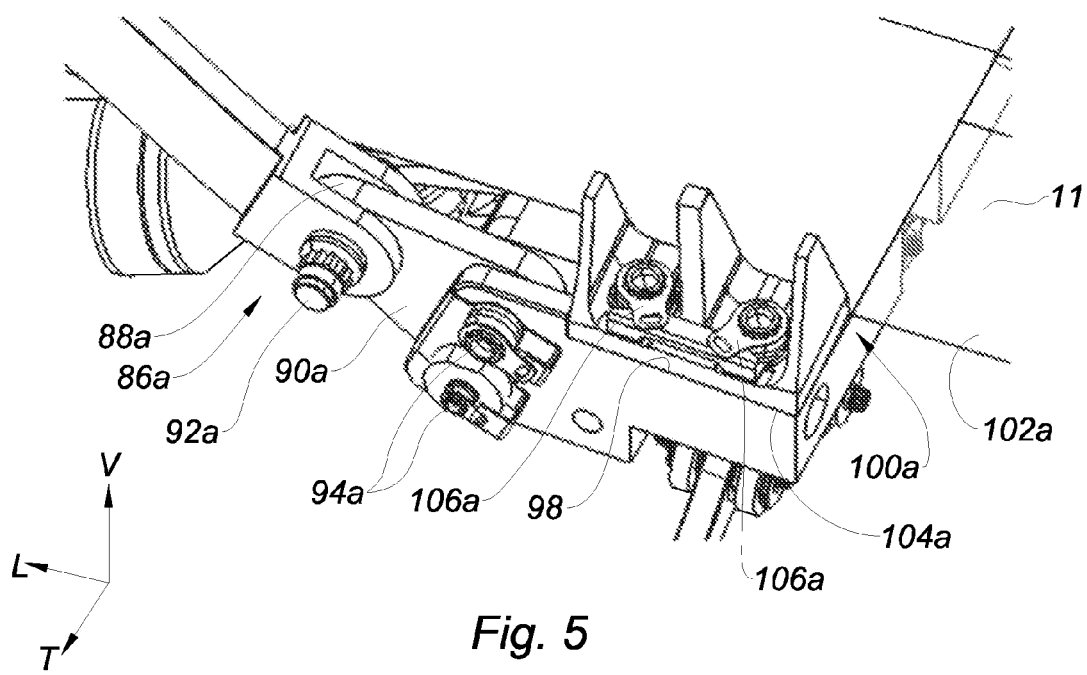
FIG. 5 is a detail perspective view, which illustrates the link of the supporting structure on the rear suspension according to the teachings of the present disclosure.

As can be seen in FIG. 4, the turbojet engine is linked on the pylon 11 by means of a front suspension 24 fastened on the fan casing 18 of the turbojet engine and of a rear suspension 26.

Figure 2:
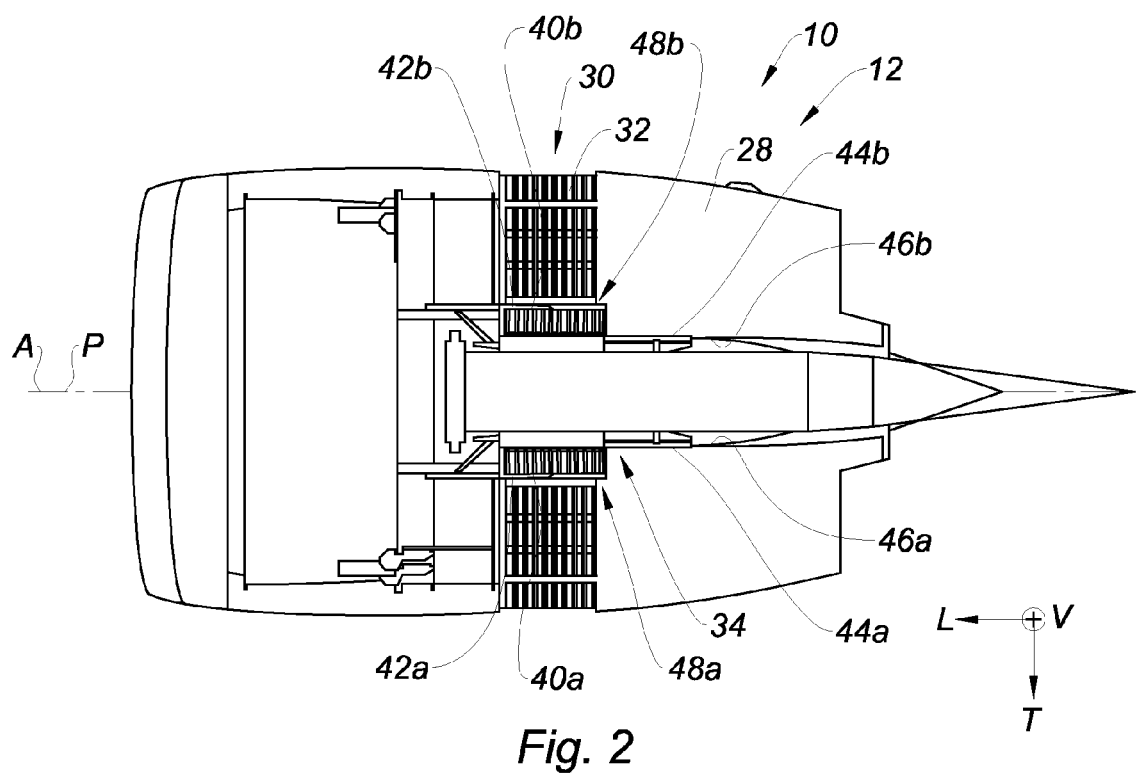
FIG. 2 is a schematic top view similar to that of FIG. 1, which illustrates the movable cowl in the open position according to the teachings of the present disclosure.

The thrust reverser device 21 comprises a cowl 28 which is movably mounted in longitudinal translation from front to rear along the axis A of the nacelle 12, between a closed position, shown in FIG. 1, in which the cowl 28 provides the aerodynamic continuity of the nacelle 12, and an open position, shown in FIG. 2, in which the cowl 28 opens a passage 30 for deflecting the airflow in the nacelle 12.

In addition, the device 21 comprises sliding thrust reverser cascades 32, which are driven by the movable cowl 28, between a retracted position between the fan casing 18 and the outer envelope (not shown in FIGS. 1 and 2) of the nacelle 12, corresponding to the closed position of the cowl 28, and a thrust reversal position corresponding to the open position of the cowl 28, in which position the sliding cascades 32 are displaced downstream so as to be able to extend through the passage 30 opened by the movable cowl 28 in the nacelle 12.

In accordance with the present disclosure, the thrust reverser device 21 is equipped with a supporting structure 34 forming a cradle, shown in more detail in FIGS. 3 to 6, which belongs to a system 58 for installing and removing the propulsion unit 10 on the pylon 11.

The supporting structure 34 has a symmetrical design along a vertical plane of symmetry P passing through the longitudinal axis A of the nacelle 12.

Figure 3:
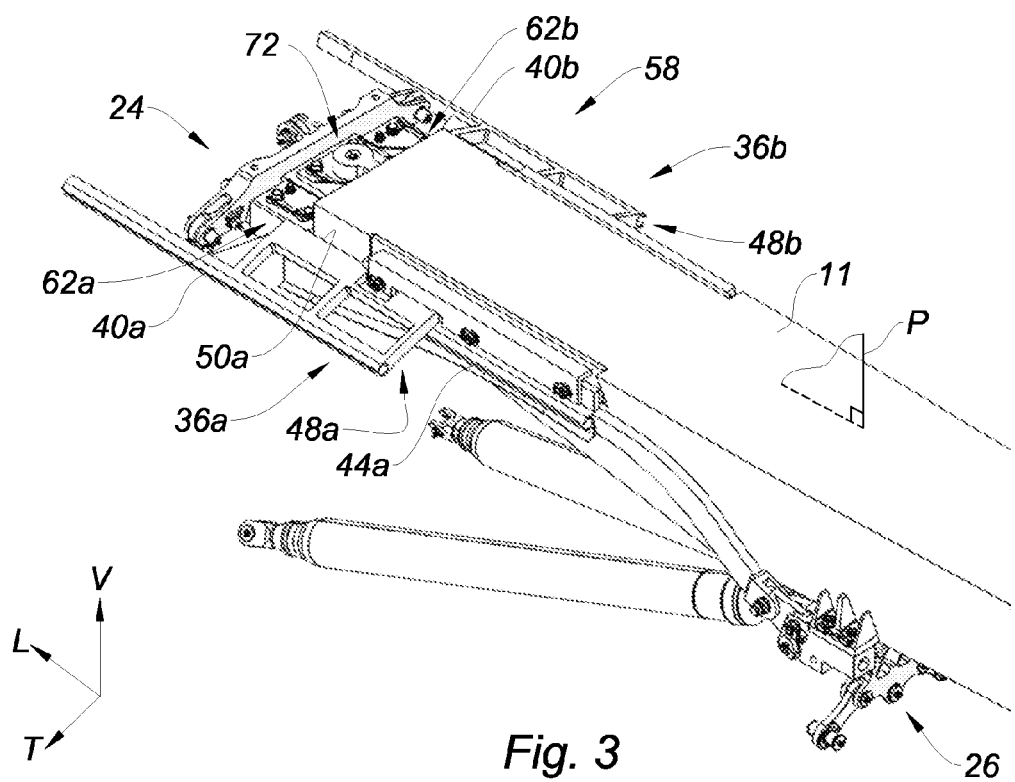
FIG. 3 is a detail perspective view, which illustrates the supporting structure linked on the front and rear suspensions of the turbojet engine according to the teachings of the present disclosure.

With reference to FIG. 3, the supporting structure 34 comprises a first spar 36a and a second spar 36b which extend longitudinally on either side of the pylon 11.

The spars 36a, 36b each comprise means for slidingly guiding the movable cowl 28 and the sliding cascades 32.

The sliding guiding device comprises a first pair of rails for guiding the cascades 32 which comprises a first rail 40a and a second rail 40b which extend longitudinally and which are arranged symmetrically along the plane of symmetry P and which are designed to provide the sliding of the thrust reverser cascades 32.

For this purpose, with reference to FIG. 2, the cascades 32, of a generally annular C-shape about the axis A of the nacelle 12, have a first guiding edge 42a and a second guiding edge 42b which cooperate with the first rail 40a and the second rail 40b respectively.

In addition, the sliding guiding device comprises a second pair of rails for guiding the cowl 28, which comprises a first rail 44a and a second rail 44b which extend longitudinally along the pylon 11 and which are arranged symmetrically along the plane of symmetry P and which are designed to provide the sliding of the movable cowl 28.

For this purpose, the movable cowl 28, of a generally annular C-shape about the axis A of the nacelle 12, has a first guiding edge 46a and a second guiding edge 46b which cooperate with the first rail 44a and the second rail 44b respectively.

The guiding rails of the cascades 32 are spaced transversely relative to the guiding rails of the cowl 28 in order to allow the arrangement of the front suspension 24 between the guiding rails of the cascades 32.

Furthermore, the guiding rails of the cascades 32 can be offset vertically also relative to the guiding rails of the cowl 28.

However, when such an arrangement is not desired, according to a non-shown variant, the first rail 40a of the first pair of rails for guiding the cascades 32 and the first rail 44a of the second pair of rails for guiding the cowl 28 are aligned on the common straight line.

Likewise, by symmetry, the second rail 40b of the first pair of rails for guiding the cascades 32 and the second rail 44b of the second pair of rails for guiding the cowl 28 are aligned on the common straight line.

Thus, according to this variant, the rails for guiding the cascades 32 and the rails for guiding the cowl 28 can be made in one-piece.

Figure 6:
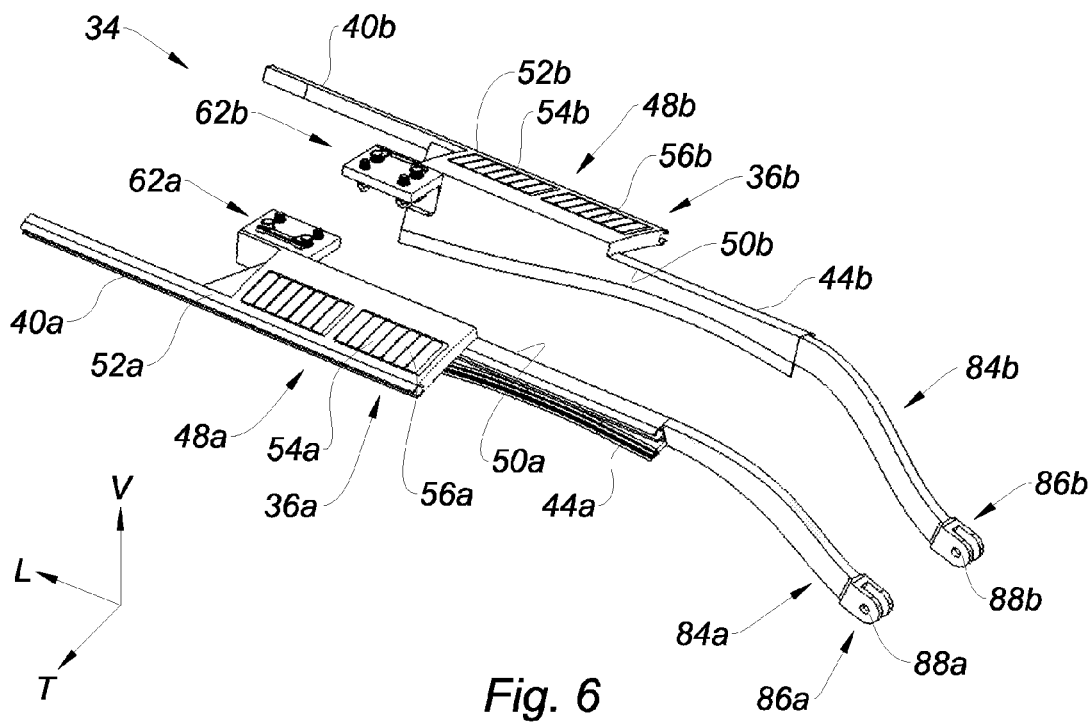
FIG. 6 is a detail perspective view, which only illustrates the supporting structure according to the teachings of the present disclosure.

With reference to FIG. 6, the first spar 36a of the cradle 34 comprises a first linking portion 48a which is delimited laterally by a first longitudinal edge 50a which extends in the vicinity of the pylon 11, and by a second longitudinal edge 52a which carries the first rail 40a for guiding the sliding cascades 32.

By symmetry, the second spar 36b of the cradle 34 comprises a second linking portion 48b which is delimited laterally by a first longitudinal edge 50b which extends in the vicinity of the pylon 11 and by a second longitudinal edge 52b which carries the second rail 40b for guiding the sliding cascades 32.

Also, each linking portion 48a, 48b comprises an opening 54a, 54b which is discovered by the movable cowl 28 in its open position, to allow the redirection of the air flow.

According to one form of the present disclosure, illustrated in FIG. 6, each opening 54a, 54b is equipped with a fixed cascade 56a, 56b respectively, each cascade including fins designed to redirect the air flow towards the front of the nacelle 12, to participate in the thrust reversal, when the movable cowl 28 occupies its open position.

Advantageously, the fins of the fixed cascades 56a, 56b can be arranged so as to orient the air flow along a transversely inclined angle to avoid redirecting the air flow towards the wing of the aircraft.

In one variant, each opening 54a, 54b, or one of the openings 54a, 54b, can be all or partly obstructed to improve the efficiency of the thrust reverser.

Indeed, by varying the ejection surface of the openings 54a, 54b, it is possible to vary the ratio between the ejection surface of the nozzle of the propulsion unit and the ejection surface of the passage 30 uncovered by the movable cowl 28 of the thrust reverser. This ratio, which ideally tends towards the value one, is known under the name "area match".

In accordance with the present disclosure, the system 58 for installing and removing the propulsion unit 10 comprises the supporting structure 34 which is adapted to support the sliding cascades 32 and the movable cowl 28.

The system 58 is designed to promote the installation and the removal of the propulsion unit 10 by releasing the front suspension 24 and the rear suspension 26 which link the turbojet engine to the pylon 11.

For this purpose, the supporting structure 34 comprises a front part which is linked on the front suspension 24 of the turbojet engine, and a rear part which is linked on the rear suspension 26 of the turbojet engine.

As can be seen in FIGS. 3 to 7, the supporting structure 34 comprises a first tab 62a which extends horizontally from the inner edge 50a of the first spar 36a of the cradle 34.

By symmetry along the plane P, the supporting structure 34 comprises a second tab 62b which extends horizontally from the inner edge 50b of the second spar 36b of the cradle 34.

In a complementary way, the front suspension 24 of the turbojet engine has a first flat section 66a designed to bear vertically and to be fastened on the associated first tab 62a of the supporting structure 34 by means of two bolts 68a, a second flat section 66b designed to bear vertically and to be fastened on the associated second tab 62b of the supporting structure 34 by means of two bolts 68b, and a third flat section 70 interposed between the two other flat sections.

The central flat section 70 bears vertically on a bracket 72 which extends horizontally from the front free end of the pylon 11 and which delimits a reinforcing rib 74.

The rib 74 delimits a through-hole 76 adapted to cooperate with a centering pin 78 mounted on the front suspension 24.

In addition, the bracket 72 is removably fastened on the front suspension 24 by four bolts 80.

Also, the first spar 36a of the cradle 34 comprises a first branch 84a which extends generally longitudinally towards the rear to form a first linking clevis 86a.

The first clevis 86a comprises two lugs which delimit therebetween a vertical slot 88a designed to cooperate with a first connecting rod 90a.

The first connecting rod 90a is linked to one end on the first clevis 86a by a first axis 92a and to another end on the rear suspension 26 of the turbojet engine by two axes 94a whose eccentric axis allows a transverse mounting clearance adjustment between the cradle 34 and the pylon 11.

Figure 7:
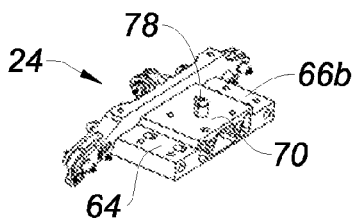
FIG. 7 is a detail perspective view, which illustrates the front and rear suspensions of the turbojet engine according to the teachings of the present disclosure.
Figure 7:
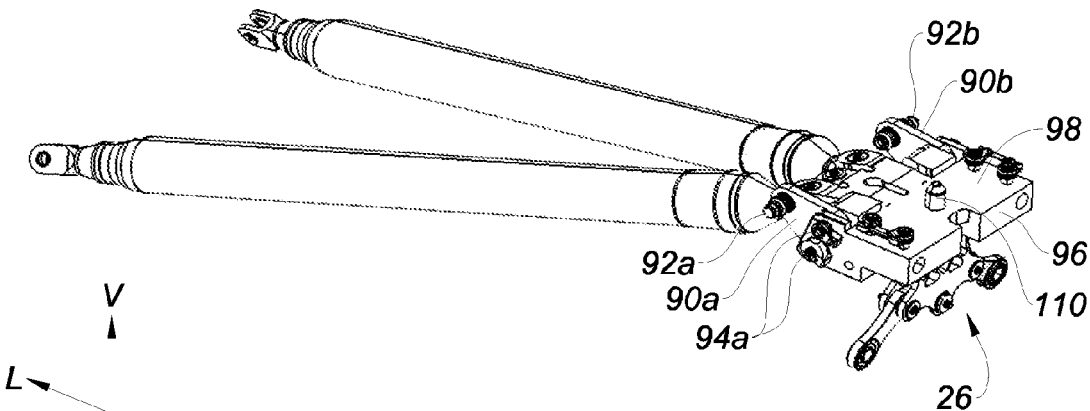

According to FIG. 7, the rear suspension 26 is delimited vertically by a lower face 96 arranged facing the turbocompressor, and an upper face 98 which bears on a lower face of the pylon 11.

In addition, the pylon 11 comprises a first square 100a which extends from a first flank 102a of the pylon and which has a bearing face 104a bearing vertically on the upper face 98 of the rear suspension 26.

The first square 100a is removably fastened on the rear suspension 26 by two bolts 106a.

By symmetry along the plane P, the second spar 36b of the cradle 34 comprises a second branch 84b which extends generally longitudinally towards the rear to form a second linking clevis 86b.

The second clevis 86b comprises two lugs which delimit therebetween a vertical slot 88b designed to cooperate with a second connecting rod 90b.

The second connecting rod 90b is linked to one end on the second clevis 86b by a first axis 92b and to another end on the rear suspension 26 by two axes (not shown), whose eccentric axis allows mounting clearance adjustment of the cradle 34.

In addition, the pylon 11 comprises a second square (not shown) which extends from a second flank 102b of the pylon and which has a bearing face bearing vertically on the upper face 98 of the rear suspension 26.

The second square is removably fastened on the rear suspension 26 by two bolts.

Also, the lower face of the pylon 11 delimits a through-hole which cooperates with a centering pin 110 which extends vertically from the rear suspension 26.

Thus, the present disclosure allows rapid and simplified installation and removal of the propulsion unit on the pylon 11 by dismounting from the pylon 11 the front suspension 24 and the rear suspension 26.

This characteristic in particular allows reducing the time required for airline companies to change the propulsion unit on an aircraft.

In addition, the present disclosure allows a reduction in the time required for the preparation of the assembly of the nacelle and of the turbojet engine prior to the mounting on the aircraft.

Also, the present disclosure allows the thrust reverser device to follow generally the movements of the turbojet engine, the supporting structure 34 being linked indirectly on the fan casing 18.

This characteristic allows in particular the sliding cascades 32 and the movable cowl 28, as well as their guiding rails 40a, 40b, 44a, 44b to follow the movement of the turbocompressor.

According to one form of the present disclosure illustrated in FIG. 4, the system 58 is equipped with a means for removably retaining the supporting structure 34, or stop means, which links the first spar 36a and the second spar 36b of the supporting structure 34 on the first flank 102a and on the second flank 102b, respectively, of the pylon 11, in order to inhibit the reciprocal transverse spacing of the spars 36a, 36b of the supporting structure 34.

However, the removable retaining device is designed to allow a longitudinal movement and a vertical movement of the supporting structure 34 relative to the pylon 11.

For this purpose, the retaining device comprises a first longitudinal profile 112a, having a U-section, which delimits a longitudinal groove 114a open downwards, facing the turbojet engine, and which is fastened on the first flank 102a of the pylon 11.

Complementarily, the retaining device comprises a first retaining tab 116a which extends vertically upwardly from the first spar 36a of the supporting structure 34 and which extends longitudinally in the groove 114a of the first profile 112a.

The first tab 116a and the associated first profile are fastened together by three transverse retaining axes 118a which are removably mounted to allow releasing the supporting structure 34 of the pylon 11.

By symmetry along the plane of symmetry P, the retaining device comprises a second longitudinal profile 112b, having a U-section, which delimits a longitudinal groove open downwards, facing the turbojet engine, and which is fastened on the second flank 102b of the pylon 11.

Complementarily, the retaining device comprises a second retaining tab which extends vertically upwardly from the first spar 36a of the supporting structure 34 and which extends longitudinally in the groove of the second profile 112b provided for this purpose.

The second tab and the associated second profile 112b are fastened together by three transverse retaining axes which are removably mounted to allow releasing the supporting structure 34 of the pylon 11.

Advantageously, the thus designed retaining device does not impede the installation and the removal along a vertical movement of the propulsion unit on the pylon 11.

However, by way of non-restrictive example, according to a non-shown variant, the retaining device can comprise cross members, or connecting rods, which extend transversely under the pylon 11 and which link together the two spars 36a, 36b of the supporting structure 34.

Advantageously, according to a non-shown variant, the thrust reverser comprises islets of an inner fixed structure which are linked on the supporting structure 34.

Similarly, according to a non-shown variant, the system according to the present disclosure comprises security locks designed to inhibit the unintentional deployment of the movable cowl 28.

The present description of the present disclosure is given by way of non-restrictive examples.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for installing and removing a propulsion unit on a pylon of an aircraft, said propulsion unit of the type comprising a nacelle and a turbojet engine, the nacelle extending longitudinally from front to rear along a longitudinal axis (A), the system comprising:
a supporting structure adapted to support a thrust reverser device, the supporting structure extending longitudinally, the supporting structure comprising a front portion, a rear portion, and a pair of spars extending longitudinally on either side of the pylon, each of the spars being secured to the front portion of the supporting structure on one end and the rear portion of the supporting structure on the other end, the front portion of the supporting structure being disposed upstream from the pylon;
a front suspension secured to the front portion of the supporting structure and being removably fastened on a front portion of the pylon; and
a rear suspension secured to the rear portion of the supporting structure and being removably fastened on a rear portion of the pylon,
wherein the turbojet engine is removably linked on the pylon by the front suspension and the rear suspension, and the disengagement of said front and rear suspensions from the pylon allows the propulsion unit to be removed from the pylon.

2. The system for installing and removing a propulsion unit according to claim 1, wherein the thrust reverser device comprises at least:
a cowl movably mounted in longitudinal translation from front to rear according to a direction substantially parallel to the axis (A) of the nacelle, between a closed position in which the cowl provides the aerodynamic continuity of the nacelle, and an open position in which the cowl opens a passage in the nacelle; and
at least one sliding thrust reverser cascade driven by the movable cowl, between a retracted position corresponding to the closed position of the cowl and a thrust reversal position corresponding to the open position of the cowl, in which position the sliding cascade is displaced downstream so as to be able to extend through said passage opened by the cowl,
wherein the supporting structure has a shape of a cradle comprising a first spar and a second spar extending longitudinally on either side of the pylon, each of said first and second spars carrying a device for slidingly guiding the movable cowl and the sliding cascade.

3. The system for installing and removing a propulsion unit according to claim 2, wherein the device for slidingly guiding the movable cowl and the sliding cascade comprises:
at least one first pair of rails for guiding the cascade, the at least one first pair of rails comprising a first rail and a second rail which are arranged on either side of the pylon and are operable to provide the sliding of the thrust reverser cascade; and
at least one second pair of rails for guiding the cowl, the at least one second pair of rails comprising a first rail and a second rail which are arranged on either side of the pylon and are operable to provide the sliding of the movable cowl.

4. The system for installing and removing a propulsion unit according to claim 3, wherein the first rail of the first pair of rails for guiding the cascade and the first rail of the second pair of rails for guiding the cowl are aligned on a common straight line, and the second rail of the first pair of rails for guiding the cascade and the second rail of the second pair of rails for guiding the cowl are aligned on the common straight line.

5. The system for installing and removing a propulsion unit according to claim 2, wherein the first spar of the supporting structure comprises:
a first linking portion delimited laterally by a first longitudinal edge extending in a vicinity of the pylon, and by a second longitudinal edge operable to carry a first rail for guiding the cascade; and
a second linking portion delimited laterally by a first longitudinal edge extending in a vicinity of the pylon, and by a second longitudinal edge operable to carry a second rail for guiding the cascade.

6. The system for installing and removing a propulsion unit according to claim 5, wherein each linking portion comprises an opening discovered by the cowl movable in its open position to allow redirection of the air flow, said opening being adapted to be all or partly obstructed.

7. The system for installing and removing a propulsion unit according to claim 2 further comprising retaining device for removably retaining the supporting structure, wherein the retaining device links the first spar and the second spar of the supporting structure on a first flank and on a second flank, respectively, of the pylon to provide passage of forces between the spars.

8. The system for installing and removing a propulsion unit according to claim 2 further comprising at least one security lock.

9. The system for installing and removing a propulsion unit according to claim 1, wherein the supporting structure has a symmetrical design along a plane of symmetry (P) passing through an axis (A) of the nacelle.

10. The system for installing and removing a propulsion unit according to claim 1, wherein the front suspension is linked on a fan casing of the turbojet engine.

11. A turbojet engine nacelle equipped with at least one system for installing and removing a propulsion unit according to claim 1.

12. The system for installing and removing a propulsion unit according to claim 1, wherein the front suspension is disposed upstream from the pylon.

* * * * *